United States Patent [19]

McBride

[11] 4,456,210

[45] Jun. 26, 1984

[54] TRANSDUCER MOUNTING

[75] Inventor: William E. McBride, Tulsa, Okla.

[73] Assignee: Lowrance Electronics, Inc., Tulsa, Okla.

[21] Appl. No.: 407,455

[22] Filed: Aug. 12, 1982

[51] Int. Cl.³ .............................................. F16B 47/00
[52] U.S. Cl. ................................ 248/205.5; 248/363; 248/316.6
[58] Field of Search ............... 248/205.5, 205.6, 205.7, 248/205.8, 205.9, 206.1, 206.2, 206.3, 206.4, 27.3, 313, 311.2, 316.9, 309.1, 300, 202.1, 467, 362, 363

[56] References Cited

U.S. PATENT DOCUMENTS

| 1,632,856 | 6/1927 | Running | 248/205.5 |
| 1,885,103 | 11/1932 | Barnett | 248/206.1 |
| 2,541,434 | 2/1951 | Nelson et al. | 248/313 X |
| 2,634,076 | 4/1953 | Van Dusen | 248/363 X |
| 2,646,950 | 7/1953 | Nelson et al. | 248/1 |
| 3,029,547 | 4/1962 | Ross, Jr. et al. | 248/205.8 |
| 3,343,772 | 9/1967 | Howell et al. | 248/313 X |
| 3,655,193 | 4/1972 | Jones | 248/363 X |

FOREIGN PATENT DOCUMENTS 2605914 8/1977 Fed. Rep. of Germany ...... 248/362

Primary Examiner—Ramon S. Britts
Assistant Examiner—Sarah A. Lechok
Attorney, Agent, or Firm—Head, Johnson & Stevenson

[57] ABSTRACT

An apparatus for mounting a transducer to the rearward surface of the transom of a boat including a suction cup of resilient material which is retained on the boat transom when pressed against it, the suction cup having an integral rearward extending boss portion, a bracket having a vertical portion affixed to the cup boss portion and having a lower, rearwardly extending arm and an upper forwardly extending arm, a fastening bracket secured to the lower arm providing means of attaching a transducer to the bracket so that the transducer is held in an upright position with the lower face of the transducer tilted at an angle with respect to the horizontal when the boat is in the water, the cup boss portion being flexible so that when the boat moves with speed the transducer is permitted to be pivoted rearwardly relative to the boat transom with the upper bracket arm portion engages the rearward surface of the cup to limit the pivotation so that the lower surface of the transducer never has a negative angle with respect to the horizontal regardless of the speed of the boat.

10 Claims, 2 Drawing Figures

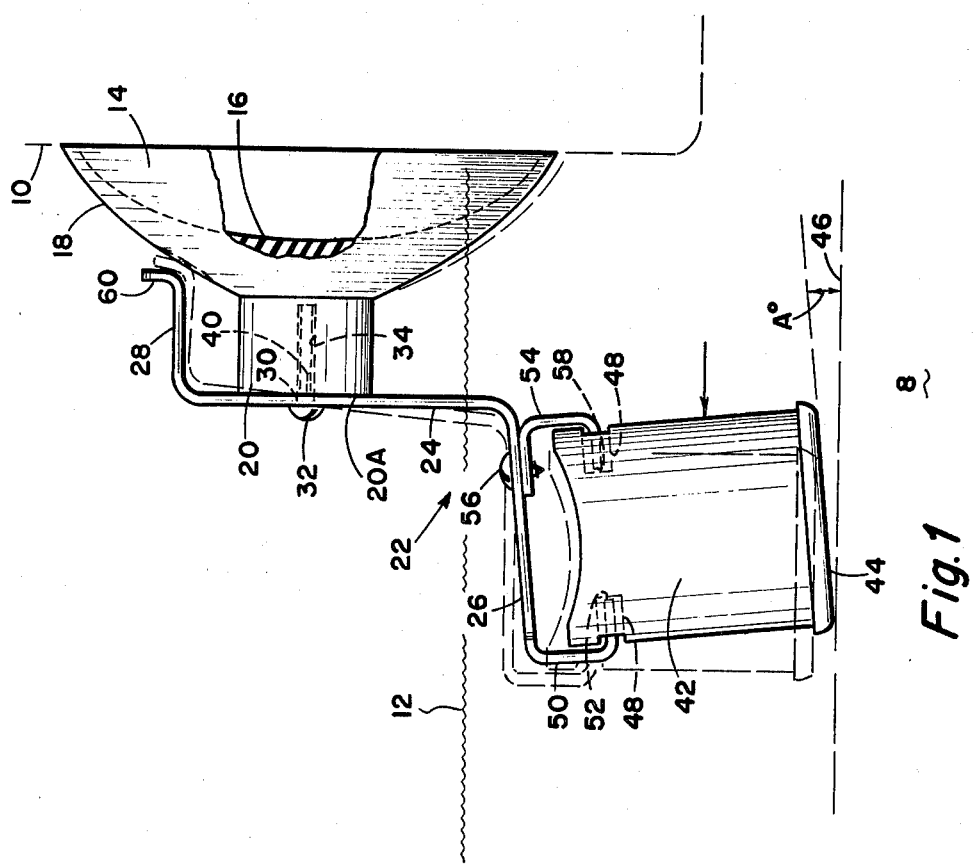
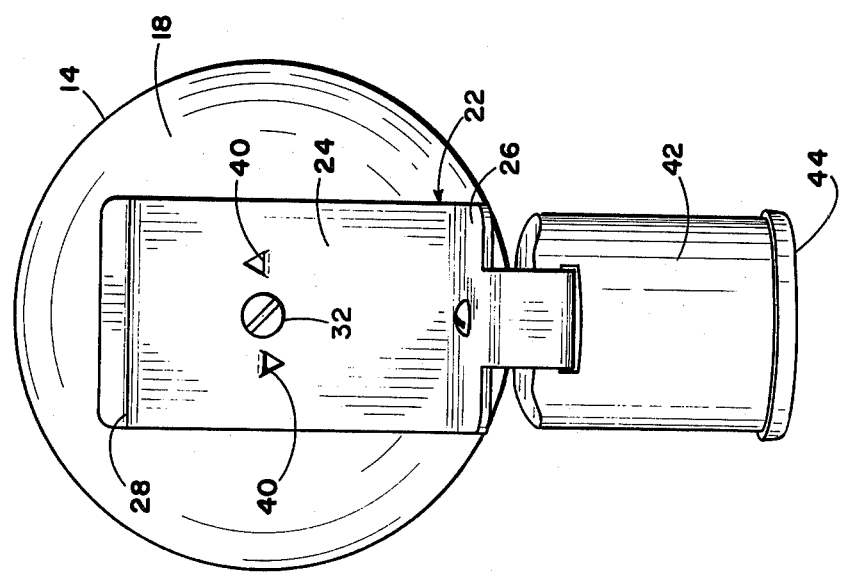

TRANSDUCER MOUNTING

SUMMARY OF THE INVENTION

An apparatus for mounting a transducer to the rearward surface of the transom of a boat floated on water as provided. The transducer is an element to convert electrical energy to sound energy which is transmitted in the water. Echoes produced by the sound energy are received by the transducer which in turn converts the received sound energy back into electrical signals. These electrical signals are employed by various kinds of sonar devices for providing an indication of the depth of water and the occurrence of objects, such as fish, in the water. In order for the transducer to effectively transmit and receive sound energy, the lower surface thereof must be within the water and the transducer must be supported on the boat so that regardless of the boat speed the lower surface has imminent contact with the water. Stated in another way, in order to achieve effective coupling of the transducer to the water, air must not be permitted to be trapped between the bottom surface of the transducer and the water. For this reason, it is important that the transducer be supported such that the angle of the bottom surface relative to the horizontal as the boat travels in water is positive, that is, wherein the forward portion of the bottom surface is higher than the rearard portion, causing a continuous positive contact of water with the bottom surface.

The mounting apparatus includes a suction cup of resilient material having a convex rearward surface and a concave forward surface. The cup is deformable so that when the concave forward surface is pressed against the boat transom rearward surface the resiliency of the cup creates a vacuum to thereby retain the cup in engagement with the boat transom. The suction cup has an integral rearwardly extending boss portion.

Affixed to the boss portion is a bracket, preferably made of metal and preferably in the form of an elongated parallel-sided strip of sheet material formed to provide a vertical portion with an integral rearwardly extending lower arm portion and an integral upper forwardly extending arm portion. The vertical portion is affixed to the suction cup boss portion so that arm is supported in a generally vertical position. Means is provided for removably attaching the bracket vertical portion to the cup boss portion such as by a bolt and nut arrangement. The transducer is secured to the bracket lower arm. This can be achieved by the lower arm being bent in two 90° bands forming a U-shaped portion so that the lower end portion is in a plane parallel the lower arm portion and below it. A fastener bracket, being generally U-shaped, is then attached to the bracket lower arm portion such as by means of a screw. The transducer then is supported between the two U-shaped portions such as by providing opposed slots adjacent the upper end of the transducer.

The bracket upper arm portion has an upwardly extending extension which, in the static position of the mounting apparatus, is spaced slightly away from the rearward surface of the cup. When the transducer is subject to force imparted as the boat moves at a high velocity in the water, the resiliency of the cup boss portion permits the bracket to be tilted slightly. The upward extension of the upper arm portion engages the rearward surface of the cup and limits the amount of tilt. The bracket is arranged in such a way that regardless of the speed of the boat the lower face of the transducer always has a positive angle relative to the horizontal as the boat travels in the water so that positive contact is at all times made between the lower surface of the transducer and the water and, therefore, the possibility of air bubbles being formed against the lower surface is prevented.

BRIEF DESCRIPTION OF THE DRAWINGS

FIG. 1 is an elevational view showing a transducer mounted on the transom of a boat with the position of the transducer and bracket under static or low-speed conditions indicated in solid outline and under high-speed conditions indicated in dotted outline.

FIG. 2 is a rearward view of the transducer device of FIG. 1. FIG. 2 does not show the transom of a boat to which the device is typically mounted when in use.

DETAILED DESCRIPTION

Referring to the drawings, and first to FIG. 1, a preferred embodiment of the invention is illustrated. The element 10 is the rearward surface of the transom of a boat floating in water, the surface of which is indicated by the numeral 12. The invention is a device to attach a transducer to the boat transom rearward surface 10 and includes a suction cup 14 formed of a resilient material, such as natural or synthetic rubber. The cup 14 has an inner concave surface 16 and a rearward outer convex surface 18. The cup further has an integral rearwardly extending boss portion 20 having a flat rearward surface 20A.

Due to the inherent resiliency of the cup 14, the forward concave surface 16 may be pressed against the boat transom rearward surface 10. The resiliency urging the return of the cup to its normal position creates a vacuum to thereby hold the cup against the boat transom surface 10.

Secured to the cup boss portion rearward surface 20A is a bracket generally indicated by the numeral 22. The bracket includes a vertical portion 24, an integral lower rearwardly extending arm portion 26, and an upper integral forwardly extending arm portion 28. The bracket 22 may be formed of metal such as a strip of sheet metal bent into the form illustrated.

To secure the bracket 22 to the cup boss portion rearward surface 20A, an opening 30 is formed in the vertical portion 22 which receives a bolt 32. An opening 34 in the cup and integral boss portion also receives bolt 32. By means of a washer 36 and nut 38 the bolt and thereby the bracket is secured to the cup 14.

To prevent the bracket from rotating about bolt 32, two integral forwardly extending lances 40 are punched in the vertical portion 24. The lances 40 penetrate the resilient integral boss portion 20 when the bracket is attached to the cup.

Affixed to the bracket is a transducer 42. While the transducer 42 may be of a variety of configurations, the illustrated arrangement is typical in which the transducer is a cylindrical, encapsulated member having an outer housing of plastic. The interior of the transducer, which does not form a part of the invention and therefore is not illustrated, includes a piezoelectric crystal device. The transducer 42 will have wires extending from it (not shown). By means of such wires electrical energy may be imparted to the piezoelectric crystal to generate sound waves. These sound waves travel through the transducer lower surface 44. When the lower surface is below the level of water 12 sound waves are propagated in the water. When the sound waves engage the bottom of the water or an object in the water, such as a fish, reflections or echos are created. These echos impinge against the transducer lower surface 44 and are conducted to the piezoelectric crystal within the transducer, causing the crystal to generate electrical signals. Thus a transducer 42 both generates and receives sonic energy. The electrical signals generated by the received sonic energy provide means or indicating the depth of body of water and the presence of objects within the water. These signals are conducted to sonar apparatus contained within the boat (not shown). In order for the transducer 42 to function properly, the bottom surface 44 must be in intimate contact with the water in which the transducer is used. When the boat to which the transducer is affixed is stationary or traveling at a slow speed, it is not difficult to maintain intimate contact of the bottom surface 44 with water. However, if the boat travels at a high speed and the surface 44 is tilted so that it is at a negative angle with respect to the horizontal indicated by line 46, water bubbles can be created beneath the bottom surface 44. More particularly, at a sufficient speed a cavity can be generated by the transducer; and if the cavity exists at the transducer bottom surface 44, the effective transfer of sonic energy between the transducer and the water is impaired. For this reason, it is important that the angle A as indicated between the transducer housing bottom 44 and horizontal 46 be at a positive angle, that is, always greater than zero, and preferably is at about 6°.

The transducer housing 42 has opposed slots 48 adjacent the upper end. The rearward arm portion 26 of bracket 22 has an integral perpendicular portion 50. The end portion 52 of the bracket is spaced from and parallel the main lower arm portion 26. A U-shaped fastener bracket 54 is secured to the lower surface of bracket rearward arm portion 26 and is held in place by a screw 56. The end 58 of the fastener bracket 54 is received in one slot 48 in the transducer with the other slot receiving portion 52.

When the boat to which the transducer is supported is traveling at a high speed, the force of the water flow against the transducer 42 causes the bracket 22 to be deflected rearwardly to the dotted position shown. The upper arm portion 28 has an integral up-turned end portion 60 which engages the rearward, concave surface of cup 14 to limit the deflection of the bracket, so that the lower surface 44 of the transducer cannot attain a negative angle, that is, angle A will always be greater than 0° regardless of the boat speed.

To prevent the possibility of the transducer being lost if the cup 14 should be dislodged from the boat transom, a lanyard (not shown) may be attached to the transducer or to the bracket and to the boat. The conductor which extends from transducer 42 to an electronic sonar instrument in the boat is also not shown.

The apparatus for mounting transducer 42 to the boat transom 10 is economical and yet very effective. It can easily be moved from one boat to another and can be taken off by the user for any purpose, such as when loading the boat onto a trailer or when the boat is to remain in the water but is not to be used for a length of time. All that is required to remove the transducer and its mounting apparatus is to disengage cup 14 from the boat transom which can be accomplished by pulling up the edge of the cup to allow air to cancel the vacuum formed when the concave surface 16 is pressed toward the boat transom.

While the invention has been described with a certain degree of particularly, it is manifest that many changes may be made in the details of construction and the arrangement of components without departing from the spirit and scope of this disclosure. It is understood that the invention is not limited to the exemplified embodiments set forth herein but is to be limited only by the scope of the attached claim or claims, including the full range of equivalency to which each element thereof is entitled.

What is claimed is:

1. Apparatus for mounting a transducer to the rearward surface of the transom of a boat floated on water, comprising:
    a suction cup of resilient material having a convex rearward surface and a concave forward surface, the cup being deformable whereby the concaved surface when pressed against a boat transom rearward surface creates a vacuum to thereby retain the cup in engagement with the boat transom, the suction cup having an integral rearwardly extending boss portion;
    a bracket having a vertical portion affixed to said suction cup boss portion and having a lower, rearwardly extending arm portion and an upper forwardly extending arm portion;
    means of securing a transducer to said bracket lower arm portion whereby the transducer is supported so that the lower surface thereof is below the surface of water on which a boat is floated, the transducer being supported by the bracket to resist the force of water against the transducer as the boat moves through the water, the forward end of the upper arm terminating adjacent to and rearwardly of said cup rearward surface, the resiliency of said cup permitting said bracket to pivotally displace relative to the boat transom, said bracket upper arm engaging said cup rearward surface thereby limiting the degree of pivotation of said bracket.

2. An apparatus for supporting a transducer according to claim 1 wherein the transducer to be supported has slots on the opposite sidewalls thereof adjacent the top and wherein said means of supporting a transducer to said bracket lower arm protion includes the arrangement wherein the end of the lower arm portion is bent into a U-shaped configuration so that the end is spaced apart and parallel the main lower arm portion;
    and including a fastener bracket of U-shaped configuration removably affixed to said lower arm portion, the end of the lower arm portion being received in one slot in a transducer housing and said fastener bracket being received in the opposite transducer housing slot.

3. An apparatus for supporting a transducer according to claim 1 wherein said bracket upper arm has an integral upwardly extending portion forming the upper arm end, the upwardly extending portion serving to engage the rearward face of said cup when said bracket is pivoted.

4. An apparatus according to claim 1 wherein said cup boss portion has a threaded screw receiving recess therein and wherein said bracket vertical portion has a screw opening therein, and wherein said bracket upper portion has at least one integrally formed forwardly extending lance portion adjacent to and spaced from said screw opening and including a screw received in said opening and said recess, said lance portion extending into said cup boss portion to prevent said bracket from pivoting about the axis formed by said screw.

5. Apparatus for mounting a transducer on the rearward surface of the transom of a boat floated on water for transmitting and receiving sonic energy in the water, comprising:
- a suction cup of resilient material having a convex rearward surface and a concave forward surface, the cup being deformable whereby the concaved surface when pressed against a boat transom rearward surface creates a vacuum to thereby retain the cup in engagement with the boat transom, the suction cup having an integral rearwardly extending boss portion;
- a bracket having a vertical portion affixed to said suction cup boss portion and having a lower, rearwardly extending arm portion;
- means of affixing a transducer to said bracket lower arm portion whereby the transducer is supported so that the lower surface thereof is below the surface of water on which a boat is floated, the forward end of the upper arm terminating adjacent said cup rearward surface, the resiliency of said cup permitting said bracket to pivotally displace relative to the boat transom;
- and means limiting the degree of said bracket pivotation.

6. An apparatus according to claim 5 wherein the transducer has slots on the opposite sidewalls thereof adjacent the top and wherein said means of supporting the transducer to said bracket lower arm portion includes the arrangement wherein the end of the lower arm portion is bent into a U-shaped configuration so that the end is spaced apart and parallel the main lower arm portion;
- and including a fastener bracket U-shaped configuration removably affixed to said lower arm portion, the end of the lower arm portion being received in one slot in the transducer housing and said fastener bracket being received in the opposite transducer housing slot.

7. An apparatus for supporting a transducer according to claim 5 wherein said bracket has an upper forwardly extending arm portion, the upwardly extending portion serving to engage the rearward face of said cup when said bracket is pivoted thereby providing said means to limit the degree of said bracket pivotation.

8. An apparatus according to claim 5 wherein said cup boss portion has a threaded screw receiving recess therein and wherein said bracket vertical portion has a screw opening therein, and wherein said bracket vertical portion has at least one integrally formed forwardly extending lance portion adjacent to and spaced from said screw opening and including a screw received in said opening and said recess, said lance portion extending into said cup boss portion to prevent said bracket from pivoting about the axis formed by said screw.

9. Apparatus for mounting a transducer to the rearward surface of the transom of a boat floated on water, the transducer having slots on the opposite sidewalls adjacent the top, the apparatus comprising:
- a suction cup of resilient material having a convex rearward surface and a concave forward surface, the cup being deformable whereby the concaved surface when pressed against a boat transom rearward surface creates a vacuum to thereby retain the cup in engagement with the boat transom, the suction cup having an integral rearwardly extending boss portion;
- a bracket having a vertical portion affixed to said suction cup boss portion and having a lower, rearwardly extending arm portion, the end of the lower arm portion being bent into a U-shaped configuration so that the end is spaced apart and parallel the main lower arm portion; and
- a fastener bracket of U-shaped configuration removably affixed to said lower arm portion, the end of the lower arm portion being received in one slot in a transducer housing and said fastener bracket being received in the opposite transducer housing slot, whereby the transducer is supported so that the lower surface thereof is below the surface of water on which the boat is floated, the resiliency of said cup permitting said bracket to pivotally displace relative to the boat transom.

10. Apparatus according to claim 9 wherein said bracket has an upper forwardly extending arm portion terminating adjacent said cup rearward surface, and wherein the upper arm limits the degree of pivotation of said bracket relative to the boat transom.

* * * * *